March 18, 1969     H. W. MERGLER     3,433,065
MARINE SPEEDOMETER AND ODOMETER
Filed April 11, 1966                     Sheet 1 of 3
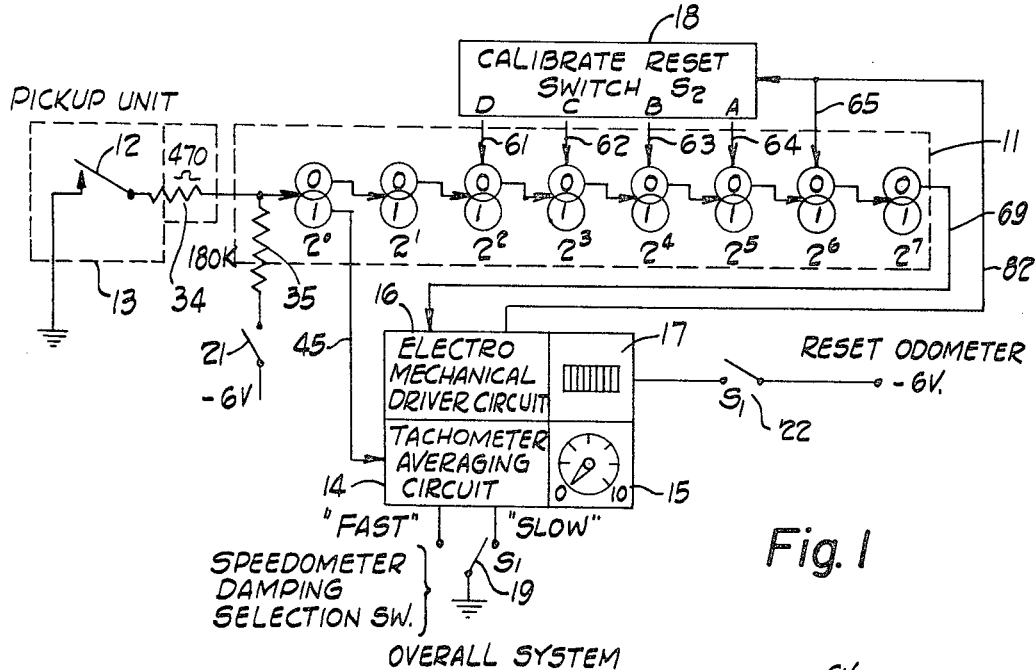
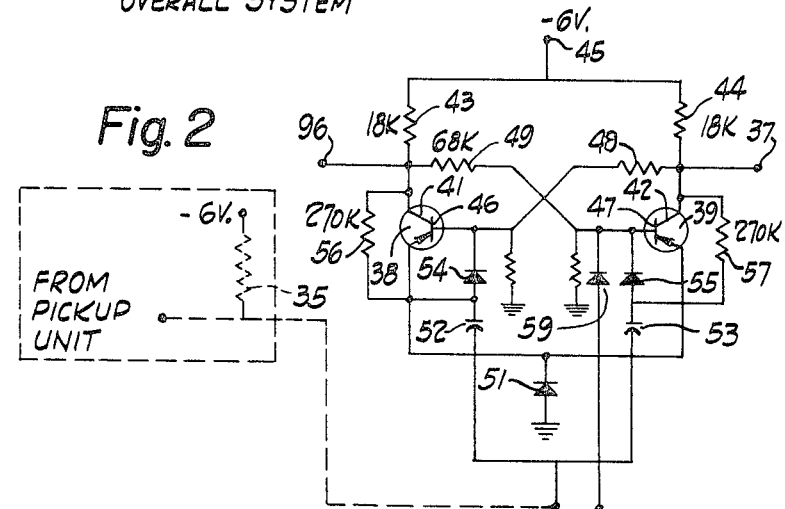
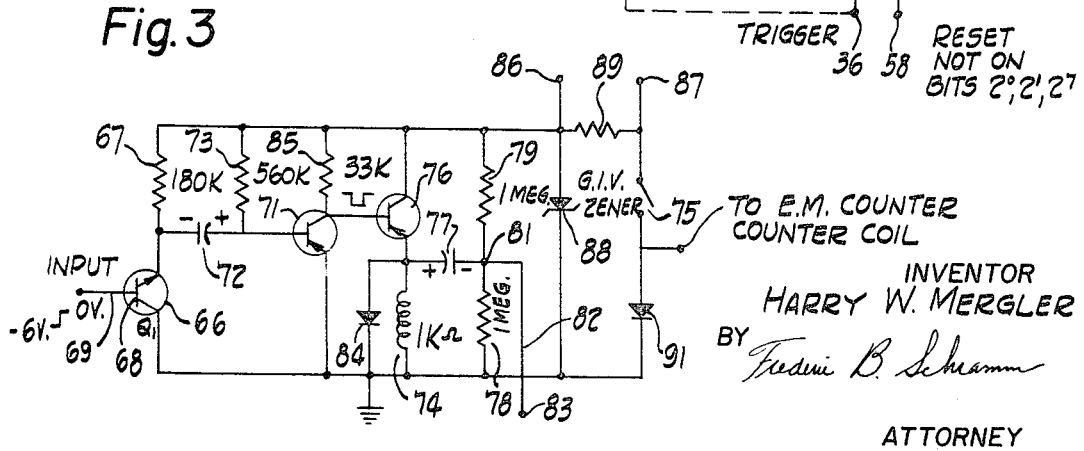
INVENTOR
HARRY W. MERGLER
BY Frederic B. Schramm
ATTORNEY March 18, 1969  H. W. MERGLER  3,433,065
MARINE SPEEDOMETER AND ODOMETER
Filed April 11, 1966  Sheet 2 of 3

INVENTOR
HARRY W. MERGLER
BY
ATTORNEY

March 18, 1969 H. W. MERGLER 3,433,065
MARINE SPEEDOMETER AND ODOMETER
Filed April 11, 1966
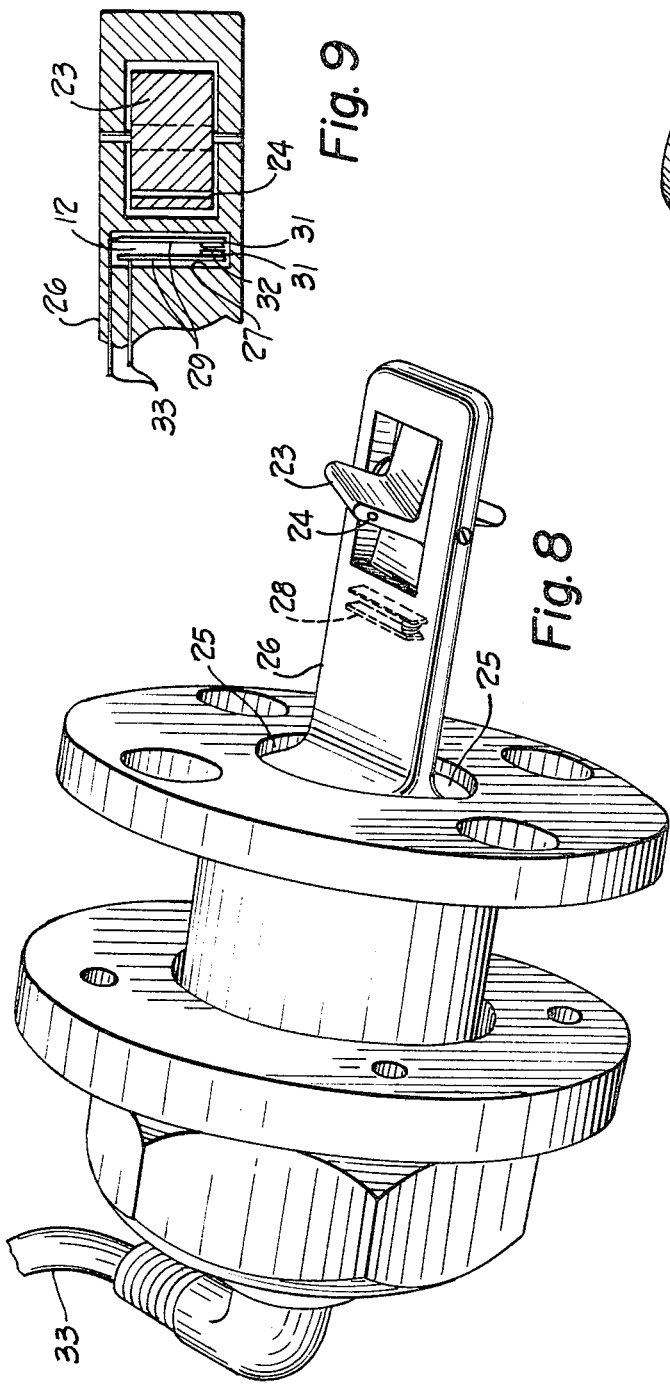
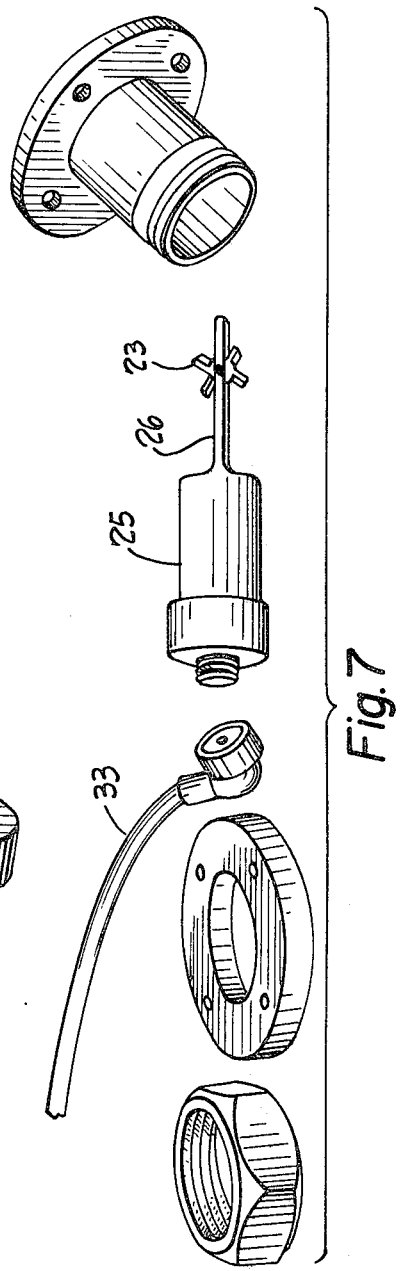
INVENTOR
HARRY W. MERGLER
BY Frederic B. Schramm
ATTORNEY

United States Patent Office 3,433,065
Patented Mar. 18, 1969

3,433,065
MARINE SPEEDOMETER AND ODOMETER
Harry W. Mergler, Cleveland, Ohio, assignor of one-tenth to Case Institute of Technology, a corporation of Ohio
Filed Apr. 11, 1966, Ser. No. 547,068
U.S. Cl. 73—187
Int. Cl. G01c 23/00
10 Claims

ABSTRACT OF THE DISCLOSURE

An impeller mounted on the hull of a ship, rotating proportionally to distance travelled by the ship is arranged to divert constant-current impulses from a generator to a current-responsive instrument to indicate speed of the ship. Rotation of the impeller is transmitted by magnetic pick-up, and a binary counter is provided, which is responsive to the pick-up for actuating a register to record distance travelled by the ship.

---

This invention relates to marine speed indication and distance measurement. An object of invention is to provide an improved arrangement for measuring speed and distance traveled, which is readily adjusted or calibrated, which provides accurate indications, which is convenient in use and is practical for small boats.

A further object of the invention is the provision of a simple and inexpensive speed and distance indicator which may be mounted in a position on the boat where it is most easily observed by the tillerman or the master of the vessel, while permitting the impeller or portion of the apparatus making contact with the water to be mounted in the position on the hull which promotes the greatest degree of accuracy.

Other and further objects, features, and advantages of the invention will become apparent as the description proceeds.

In carrying out the invention in accordance with a preferred form thereof, an impeller is mounted in such a position as to protrude through the hull of a craft and turn a fixed number of revolutions for every fixed distance traveled by the boat relative to the water. A small permanent magnet is mounted within the impeller and a magnetic-flux responsive-device is mounted in proximity to the impeller. For example, a reed switch may be mounted adjacent to the impeller. The reed switch constitutes magnetizable reeds, carrying cooperating contacts so that each time the magnet of the impeller comes into the position of the magnetic material in the reed switch, the reed switch contacts close.

A current-responsive instrument is provided which measures the frequency of operation of the reed switch. For this purpose a constant-current electrical circuit is provided, an arrangement for causing current to flow through the current-responsive instrument whenever the reed switch contacts close. A current-averaging device is employed so that a reading of the current measuring instrument is indicative of the rotational speed of the impeller and the velocity of the craft relative to the water.

Distance measurement is accomplished by an electromechanical counter with an electrical counting circuit responsive to the impeller reed switch. Preferably a digital, electromechanical counter is actuated whenever the impeller has made a predetermined number of revolutions representing a predetermined distance traveled. Preferably, the same solid-state circuit supplies pulses to the speed measuring circuit and to the amplifier for the electromechanical counter.

A solid-state digital counting circuit is provided with a calibrate, reset switch which enables the digital counter to be adjusted with regard to the number of impulses required to set it back to zero and repeat its counting cycle.

Figure 4:
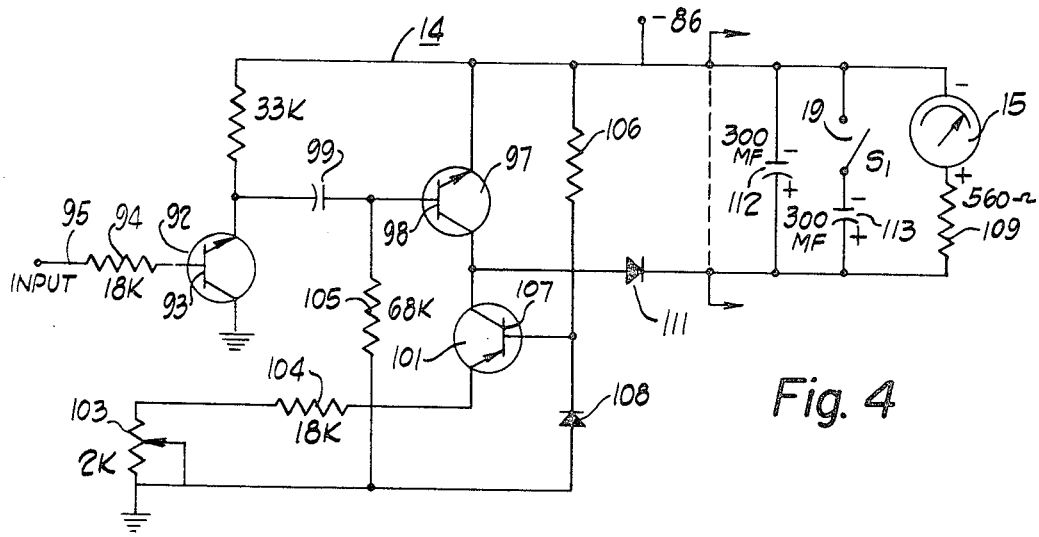
Figure 5:
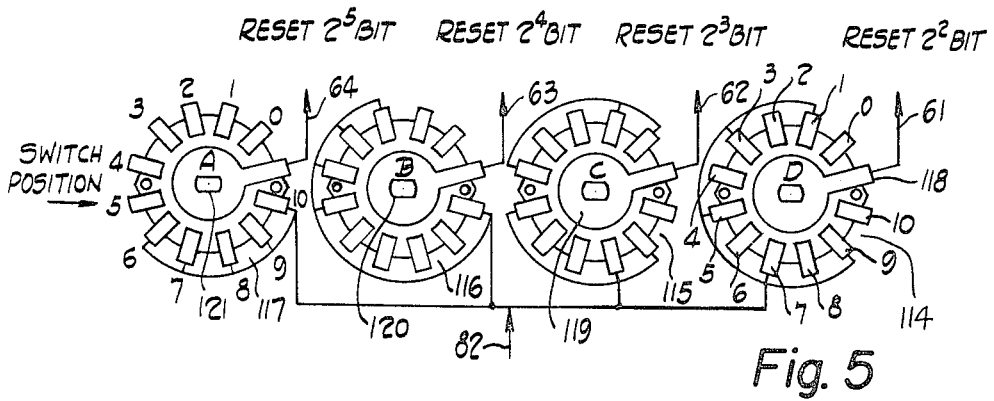
Figure 6:
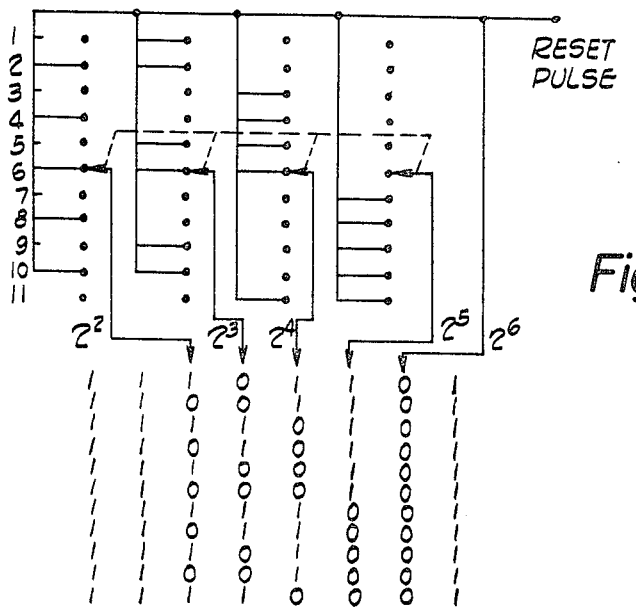

A better understanding of the invention will be afforded by the following description considered in conjunction with the accompanying drawings in which:

FIG. 1 is a symbolic diagram of the overall system.
FIG. 2 is circuit diagram of one of the stages of the solid-state digital electrical counting circuit of FIG. 1.
FIG. 3 is a circuit diagram of the driver for the electromechanical counter.
FIG. 4 is a diagram of the tachometer averaging circuit with a selection switch, employed for adjusting the degree of damping obtained in the speed measurement circuit to adapt the apparatus for varying conditions of the sea.
FIG. 5 is a diagram of the calibrate-reset switch.
FIG. 6 is a diagram of the calibrate-unit switch circuit.
FIG. 7 is an exploded view of the impeller mounting unit.
FIG. 8 is a perspective view of the impeller mounting unit, assembled but not mounted in position on the hull of the craft, and
FIG. 9 is a cross-sectional view of the portion of the impeller-unit carrying the reed switch and the impeller showing the relative locations of the magnets in the impeller and in the reed switch.

Like references, characters are used throughout the drawing to designate like parts.

As shown in FIG. 1, the system comprises a binary counter circuit 11, having an input connection to a reed switch 12, in an impeller pickup unit 13, a tachometer-averaging circuit 14, connected to a deflecting indicator instrument 15, an electromechanical driver circuit 16, connected between the output of binary counter-circuit 11 and an electromechanical counter or odometer 17.

The binary counter circuit 11, is provided with a calibrate-reset switch 18, and the tachometer circuit 14, is provided with a speedometer damping selection switch 19.

A logic power-supply switch 21 and a normally-open odometer reset switch or 0 switch 22 is also provided.

As shown in FIGS. 8 and 9 the impeller unit 13 comprises a rotatable blade impeller 23 or set of blades or vanes composed of plastic or other material, which is not magnetic or subject to magnetic effects and which is not subject to corrosion in fresh or sea water, with a small magnet 24 or slug of magnetizeable material embedded therein.

For supporting the impeller 23 in the water, a non-magnetic mounting unit 25 is provided which has a strut 26, projecting through the hull of the water craft. The strut 26 serves also as a reed switch housing. The impeller unit 13, is mounted in a hull position where the flow is not turbulent, but laminar. For example, it may be mounted astern of midship as far below the water line as possible.

As shown in the drawings, the reed switch housing 27 has a chamber 28 for receiving the reed switch 12, which is a unit hermetically sealed in glass and may take the form, for example, of the type DRG–1 reed switch manufactured by Hamlin, Inc. of Lake Mills, Wis. The form shown is a normally open switch with a pair of flexible metal, contact-carrying reeds 29.

Although the switch contacts 31 are coated with a layer 32 of suitable corrosion-resistant, high-electrical-conductivity metal, such as gold or silver, they are composed of a base of iron or the like, so that they are attracted toward one another to close an electrical contact between conductors 33 when a magnet is brought in proximity to the reed switch contacts 31. The invention is not limited to the type of switch illustrated as other sensing could be also used.

As indicated in FIG. 1, the binary-counter circuit 11 comprises a bank of eight flip-flops with an input to the first or $2^0$ stage, from the reed switch 12, through a resistor 34. The input is negatively biased through a resistor 35 so that when the reed switch 12, closes a positive pulse is applied to the binary counter 11. Preferably, the flip-flops of binary counter 11 are of the solid state type. An illustrative circuit for the first or the $2^0$ flip-flop is shown in FIG. 2.

The succeeding stages of the binary counter 11 have the same connections except for the absence of the connections through the resistors 34 and 35 to the input trigger terminal 36. The trigger terminals of the succeeding stages (represented at 37 in FIG. 2) are connected to the output of the preceding stage as will be understood by those skilled in the art.

As shown in FIG. 2, each flip-flop circuit comprises a pair of transistors 38 and 39, shown as being of the PNP type with the emitters grounded and collectors 41 and 42 connected through load resistors 43 and 44 to a negative power supply terminal 45. The bases 46 and 47 of each transistor are cross coupled to the collector of the other transistor through resistors 48 and 49, respectively. As shown, a solid state diode 51 is connected between the emitters of transistors 38 and 39 and ground. The bases 46 and 47 are coupled to input trigger terminal 36 through coupling capacitors 52 and 53 and the solid state diodes 54 and 55, respectively. The input trigger 36 is coupled to the collectors 41 and 42 through the condensers 52 and 53 and through resistors 56 and 57, respectively. NPN transistors may be used in a flip-flop of different design.

The flip-flop of FIGURE 2 may be explained as follows. If the diode circuitry on the bases of the transistors is momentarily ignored, the remainder is a bistable multivibrator. This circuit is composed of two amplifiers which are cross coupled through resistors 48 and 49 in such a way that the circuit is unstable due to positive feedback. This feedback will tend to drive one or the other amplifier into saturation. When this happens the loop gain drops to unity and the circuit becomes stable. Since either amplifier may be saturated, the circuit is bistable. The input circuitry connected to the bases (resistor 56, diode 54, condenser 52, and resistor 57, diode 55, condenser 53) provides a means of steering an input pulse into the proper amplifier to bring it out of saturation and change the state of the flip-flop.

Assume output 96 is at essentially zero volts, and output 37 is at $v$ volts. Diode 54 will only be reverse biased by a few volts whereas diode 55 will be reverse biased by the entire supply (ground, in this particular embodiment). If a pulse is applied at the trigger input 36, this pulse will pass through both capacitors 52 and 53 and appear at the anode end of both diodes 54 and 55. Because of the large reverse bias on diode 55, the pulse will be blocked (assume pulse input less than or equal to the supply voltage) and will not appear at the base of transistor 39. The pulse will pass through diode 54, however, and remove transistor 38 from saturation long enough for the circuit to regenerate to its second stable state.

In order to reset the binary counter circuit 11, according to a desired calibration, certain stages of the counter are provided with connections through the calibrate-reset switch 18. In the arrangement shown by way of illustration, these connections are made through the $2^2$, $2^3$, $2^4$, $2^5$ and $2^6$ stages.

However, in FIG. 2, for the sake of illustration, the location of such a connection is illustrated by a reset terminal 58 connected to the base 47 through a solid-state diode 59 although the reset terminal 58 is not actually employed in the first stage represented by FIG. 2.

The calibrate reset switch 18, is an 11-position, 4-deck rotary switch. It is arranged so that the most probable setting is in the center of its range. The arrangement is such that the binary counter 11 counts backwards until it counts to −1. This is represented by 11111111 in the counter. The electromagnetic counter driver 16 senses the −1 count underflow and generates a pulse to drive the electromagnetic counter. A trailing edge of this pulse is coupled through the calibrate switch 18 to the reset lines 61 and 62, 63 and 64, and some of the flip-flops. The selected flip-flops are then reset to 0, and the others remain in the one state. There is also a feedback line 65 from the electromechanical driver circuit to the reset terminal of the $2^6$ stage.

The electromechanical driver 16 is shown in FIG. 3. The first stage comprises an emitter follower comprising a transistor 66 of the NPN type connected in series with an emitter resistor 67. It has a base 68 with an input line 69 from the output terminal 37 of the last stage, namely, the $2^7$ stage of the binary counter 11. The emitter of the transistor 66 is coupled to a pulse generator comprising a transistor 71 of PNP type. Coupling takes place through a coupling condenser 72 and a coupling resistor 73.

The electromechanical counter 17 may be of a conventional type having a counter drive coil (not shown) as the counter 17 itself does not constitute the present invention. It is coupled to the output of the pulse generator 71 through a relay which may be in the form of a reed relay having an energizing coil 74 and a pair of contacts 75. Preferably, an emitter follower transistor 76 is interposed between the collector of the transistor 71 and the reed relay coil 74.

The input emitter follower 66, 67 is necessary to avoid loading the last flip-flop with a high capacitance. The transistor 66 is NPN to provide a fast positive transition while still retaining a low average power consumption of the large value of the resistor 67. The resistor 67 must be small enough to recharge the condenser 72 before the next input arrives, but this will be a relatively long time.

The emitter of the emitter follower 76 is coupled to the reset terminals 58 and the $2^2$, $2^3$, $2^4$, $2^5$ and $2^6$ flip-flops through a coupling condenser 77, a voltage divider consisting of resistors 78 and 79 with a junction terminal 81 connected through a line 82 to reset pulse terminal 83. The reed relay coil 74 is shunted by a solid state diode 84 which protects the emitter follower from high reverse voltage transients occurring at the time the coil is de-energized. The collector resistor 85 of the transistor 71, the collector of the transistor 76 and the resistors 73 and 79 are connected to a voltage regulated terminal 86. Regulated negative voltage is produced at the voltage terminal 86 from a terminal 87 of one unregulated supply connected in series with a Zener diode 88 and a dropping resistor 89, the Zener diode 88 being connected across the voltage divider 78, 79. A solid state diode 91 is connected between the reed relay switch 75 and ground to prevent reversed-polarity pulses from affecting the reed switch to protect the contacts from the reverse voltage transient when the relay opens.

As shown in FIG. 4, the tachometer averaging circuit 14 comprises a transistor circuit supplying pulses to a condenser which in turn supplies voltage to the indicating instrument 15. There is an input emitter follower transistor 92 having a base 93 connected through a resistor 94 and a line 95 to the 0 output terminal 96 of the $2^0$ or first stage of the binary counter 11.

In the particular embodiment illustrated, where the transistor 66 is type 2N1302 and the condenser 72 is 0.068 microfarads, satisfactory results are obtained where the resistor 67 has a resistance of 180 thousand ohms and the resistor 73 has a resistance of 560 thousand ohms. The pulse generator transistor 71 is normally biased on by the resistor 73. An input transition from minus 6 volts to 0 volts will result in a positive base voltage on the transistor 71 cutting it off until the resistor 73 discharges the condenser 72 sufficiently to forward bias the transistor 71 again. The result is a pulse just long enough to operate the electromagnetic counter 17 reliably. An excessively long pulse will cause unnecessary battery drain. In the particular arrangement described for sake of illustration, one-half ampere flows through the counter 17 for the duration of the pulse, but this average to 3 milliamperes at a vessel speed of ten knots with pulses of optimum length.

The emitter follower 76 drives the relay coil 74 and also provides a positive transition to reset the binary counter 11. Resistor 79 and 78 provide back bias for the reset line decoupling diodes in the flip-flops.

The tachometer averaging circuit 14 has an input stage 92 in the form of an emitter follower NPN transistor having a base 93 connected through a resistor 94 and an input line 95 to the output terminal 37 of the $2^0$ stage of the binary counter 11.

There is a pulse generator and gate 97 comprising an NPN transistor having a base 98 coupled to the emitter of the transistor 92 through a condenser 99. There is a PNP transistor 101 forming a current source for the pulse generator 97. The transistors 97 and 101 are connected in series with resistors 103 and 104 between ground and negative terminal 86 of the minus six volt regulated power supply. A resistor 105 is provided for biasing the transistor 97 "on." Likewise, a resistor 106 is provided for biasing the PNP transistor 101 "on." Its base 107 is connected to a solid state diode 108 grounded on the positive side to provide a voltage reference for the current source.

The deflecting indicator tachometer instrument 15 may be in the form of a microammeter connected across the pulse generator 97 in series with a resistor 109 and a solid state diode 111 to maintain the polarity of the current pulses passing through the meter 15. For curent averaging a condenser 112 is connected with a positive terminal at the junction between diode 111 and the resistor 109 and the negative terminal connected to the negative power supply terminal 86.

For greater damping, a second tachometer averaging condenser 113 may be provided which is adapted to be connected in parallel with the condenser 112 by closing the switch 19.

The tachometer instrument 15 operates by putting a constant amount of charge from the condenser 112 through the meter each time an input pulse is received. The average charge per unit time, or current, is proportional to the input pulse rate. The condenser 112 is placed across the meter 15 to average these charge bursts into a steady current. The averaging interval (speed of response) is determined by the RC time constant of the capacitor and meter. The circuit always dumps the charge bursts into the capacitor but the meter can drain the charge off only in a finite time, determined by RC. Therefore temporary changes in the input charge flow which are of much slower duration than RC are not seen. (These changes are due to the quantized nature of the input charge flow on small time scales or as temporary changes in pulse rate on larger time scale.) The constant charge is derived by diverting a constant current into the capacitor 112 for a known time interval.

The current source 101 compares the voltage drop $V_0$ across the diode 108 with the drop across the resistors 103 and 104. The collector current is approximately $V_0$ divided by the sum of resistance of the resistors 103 and 104.

The transistor 92 is an emitter follower buffer stage. It is shown as an NPN type transistor for economy in obtaining a high gain, low leakage, silicon transistor. The invention is not limited thereto, however, as PNP stages are also feasible and would provide a better negative transition necessary for the next stage.

The transistor 97 is pulse generator and gate. It operates similarly to the transistor 71 in the electromagnetic driver 16 of FIG. 3. The transistor 97 is biased on by the resistor 105 and normally conducts the entire output of the current generator. When an input signal cuts off the transistor 97, the current generator output must flow into the averaging capacitors 112 and 113 until capacitor 99 discharges enough to allow the transistor 97 to bypass the current generator again. After the meter reading is at a useful operating level there is enough voltage across the condenser 112 (microammeter voltage drop for steady state) to back bias the diode 108 whenever the transistor 97 is saturated. This prevents discharge of the condenser 112 through the transistor 97 and forces the entire stored charge into the meter 15. Initially, when there is no charge on the condenser 112, the forward drop across the diode 111 is large enough when compared with the saturation voltage of the transistor 97 to limit leakage into the condenser 112 to a negligible value.

The use of current source time scheme to put charge on the condenser 112 makes the response of the circuit very linear. The magnitude of the charge burst is independent of the amount of charge already on the capacitor.

As shown in FIG. 5, the calibrate reset switch 18 is an 11-position 4-bit binary coder. It is arranged so that the most probable setting is in the center of its range. The calibrate reset switch comprises four eleven-position switch decks. There is a switch deck 114 for the $2^0$ bit, a switch deck 115 for the $2^3$ bit, and switch 116 for the $2^4$ bit and a switch 117 for the $2^5$ bit.

The switch decks 114 to 117 inclusive include movable contacts 118, 119, 120, 121, inclusive, connected to flip-flop reset lines 61, 62, 63 and 64, respectively.

For enabling a selection to make as to which flip-flop stages are to be reset, when a reset impulse comes through the reset line 82, eleven-position contact banks are provided in the calibrate switch 18, as shown in FIG. 5. In a specific example given by way of illustration, in the bank for the $2^2$ bit, stationary contacts Numbers 1, 3, 5, 7 and 9 are connected together and to the reset line 82 from the electromechanical driver circuit 16. Similarly, in the contact bank or switch deck for the $2^3$ bit, stationary contacts 0, 1, 4, 8, 9 are connected together and to the line 82; in switch deck for the $2^4$ bit stationary contacts for the 2, 3, 4, 5 and 10 switch positions are connected together into the line 82; and in the switch 117, for the $2^5$ bit, stationary contacts 6, 7, 8, 9 and 10 are connected together and to the reset line 82. This is shown by the table below.

4-DECK, 11-POSITION NONSHORTING 1 POLE/DECK

| Deck (bit) | | | | Switch Position |
|---|---|---|---|---|
| A($2^5$) | B($2^4$) | C($2^3$) | D($2^2$) | |
| 1 | 1 | 0 | 1 | 0 |
| 1 | 1 | 0 | 0 | 1 |
| 1 | 0 | 1 | 1 | 2 |
| 1 | 0 | 1 | 0 | 3 |
| 1 | 0 | 0 | 1 | 4 |
| 1 | 0 | 0 | 0 | 1 5 |
| 0 | 1 | 1 | 1 | 6 |
| 0 | 1 | 1 | 0 | 7 |
| 0 | 1 | 0 | 1 | 8 |
| 0 | 1 | 0 | 0 | 9 |
| 0 | 0 | 1 | 1 | 10 |

[1] Original bias set here.
1 reset pulse ENABLED to indicated bit.
0 reset pulse INHIBITED to indicated bit.

Each change from the bias point will change the odometer calibration ±2.32% giving a range of −11.6% to +11.6% in steps of 2.32% from the bias or center setting.

The speedometer is basically a current averaging circuit and the odometer a simple counter. The mode of velocity and distance detection is as follows:

The impeller 23 with a pitch of 19 degrees, for example, protrudes through the hull of the craft and turns 172 revolutions for every 0.01 nautical mile traveled. Tests in a low turbulence water-tunnel at speeds from .5 to 10 knots indicated a linear relationship between speed and distance. The frequency of the pulse repetition is sensed by the speedometer portion and indicated on the meter 15. The number of impeller rotations is counted until 172 is reached and an indication of 0.01 nautical mile is made on the electromechanical counter 17.

In the odometer each pulse from the pickup unit 13 is fed into the binary counter 11, which has a maximum capacity of 192 count pulses.

Feedback is provided to the counter 11 through the calibrate switch 18 enabling the counter scale to be intermittently reduced 152 pulses. Each change on the calibrate switch from the original bias point, shown in FIG. 5, changes the range of the counter by plus or minus 2.32% or four counts per cycle. This calibration serves to compensate for the difference in flow characteristics over various hull forms.

A single power supply may be used in all the circuitry, with negative 6 volts and ground. Batteries of higher voltage may be used, such as those found on many boats, having 12 or 24 volt electrical equipment for all power inputs to the system are regulated to 6.1 volts as illustrated in FIG. 3.

The odometer read switch 22 is interlocked with the logic power-supply switch 21, so that they cannot both be closed at the same time. This guards against accidental closing of the reset switch and resetting of the odometer. If the switches are left in reset position, none of the other functions of device will operate for power is denied all circuitry during odometer reset operations.

In the tachometer averaging circuit 14, insertion of the capacitor by selecting "slow" position of the selector switch 19 increases the time constant of the meter 15 by 2, reaching 67% of the actual speed value in approximately two seconds.

While the invention has been described as embodied in concrete form and as operating in a specific manner in accordance with the provisions of the Patent Statutes, it should be understood that the invention is not limited thereto since various modifications will suggest themselves to those skilled in the art without departing from the spirit of the invention.

What is claimed is:
1. A marine Speed Responsive Device comprising in combination:
an impeller mounted on the hull of a ship, exposed to water in which the ship is sailing and making a predetermined number of revolutions for each fixed distance traveled relative to the water,
a constant current generator of the transistor type having a base biased to a fixed potential,
a current-responsive instrument having a deflecting pointer, the instrument being in circuit relationship to the constant-current generator, and
bypass means for diverting current from the generator to the current-responsive instrument for each predetermined increment of rotation of the impeller.

2. Apparatus as in claim 1, wherein magnetic material is eccentrically imbedded in the impeller and a reed switch magnetically responsive to material in the impeller is mounted adjacent to the impeller and the current diverting means has an operative connection to the reed switch for rendering the diverting means responsive to actuation of the reed switch.

3. Apparatus as in claim 2, wherein a condenser is shunted across the current responsive instrument for damping out fluctuations, forming a tachometer averaging circuit, and providing an average indication of speed.

4. Apparatus as in claim 3 wherein the constant current generator is a transistor circuit connected to the condenser in series with a diode, the current diverting means is a transistor normally biased to conducting condition shunting the unit consisting of the diode and the condenser, and the operative connection between the diverting transistor is arranged for causing closure of the reed switch to deenergize the latter transistor.

5. Means for adapting the apparatus of claim 4 for indicating marine speed in heavy seas comprising an additional condenser with means for connecting it in parallel with the first named condenser to provide additional damping for the current responsive instrument.

6. Apparatus as in claim 5, wherein a flip-flop is interposed in the operative connection between the reed switch and the current diverting means.

7. Apparatus as in claim 6, wherein an electromechanical counter is provided with an actuating connection from the flip-flop for advancing the electromechanical counter one step for each predetermined number of energizations of the flip-flop.

8. A marine odometer comprising in combination:
an impeller mounted on the hull of a ship, exposed to water in which the ship is sailing and making a predetermined number of revolutions for each fixed distance traveled, relative to the water
an electromechanical counter,
a binary counter having a plurality of stages with an initial stage and a final stage, electrical connecting means responsive to impeller rotation for actuating the initial stage of the binary counter upon each rotation of predetermined angle of the impeller, a relay connected to be operated by actuation of the final stage, and connections between the relay and the electromechanical counter, constituting means for advancing the electromechanical counter one step.

9. Apparatus as in claim 8, employing resetting contacts in the binary counter and an operative connection from the said relay to the resetting contacts for resetting the binary counter.

10. Apparatus as in claim 9, wherein the binary counter is of the flip-flop type with a switch for selectively connecting or disconnecting terminals therein for varying the number of stages actuated in the transmission of the signal from the initial stage to the final stage for incrementally reducing the binary counter scale for calibration.

References Cited
UNITED STATES PATENTS

| | | | |
|---|---|---|---|
| 3,166,936 | 1/1965 | Fisher et al. | 73—231 |
| 3,287,969 | 11/1966 | Hardy | 73—187 |
| 3,301,053 | 1/1967 | Walch, et al. | 73—231 |
| 3,319,255 | 5/1967 | Houle | 73—231 |
| 3,321,969 | 5/1967 | Spencer | 73—187 |
| 1,779,783 | 10/1930 | Sylvander et al. | 73—229 |

LOUIS R. PRINCE, *Primary Examiner.*

D. O. WOODIEL, *Assistant Examiner.*

U.S. Cl. X.R.

73—231; 325—389; 330—127